Figure 1:
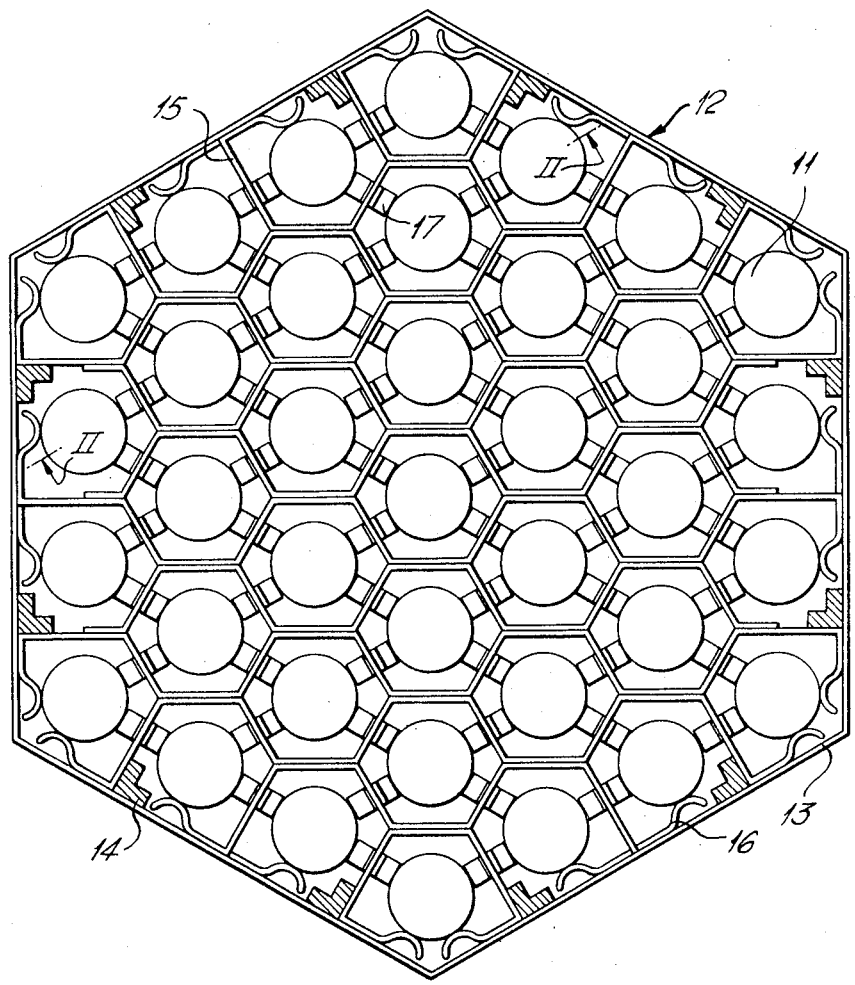

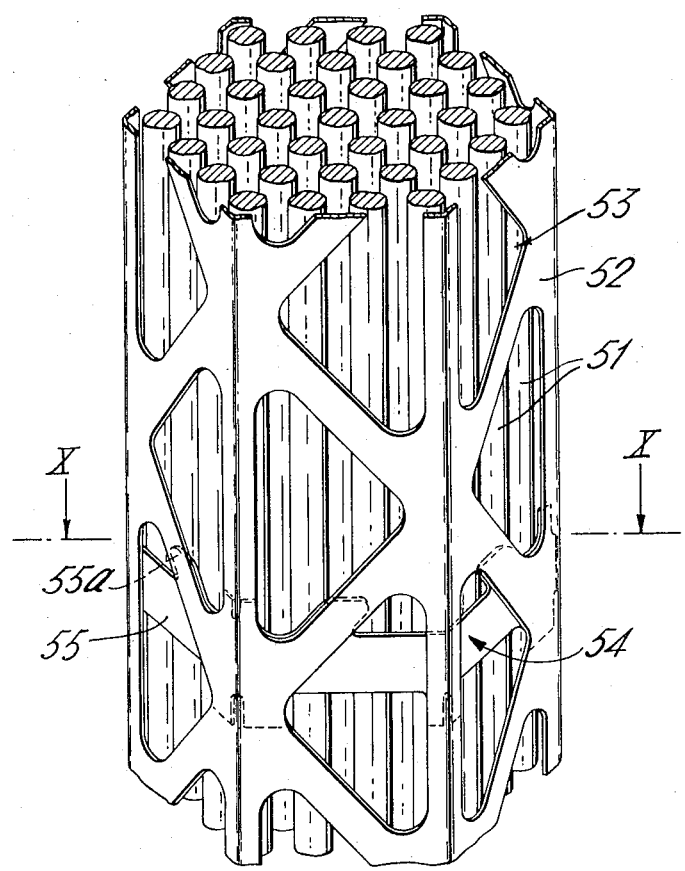

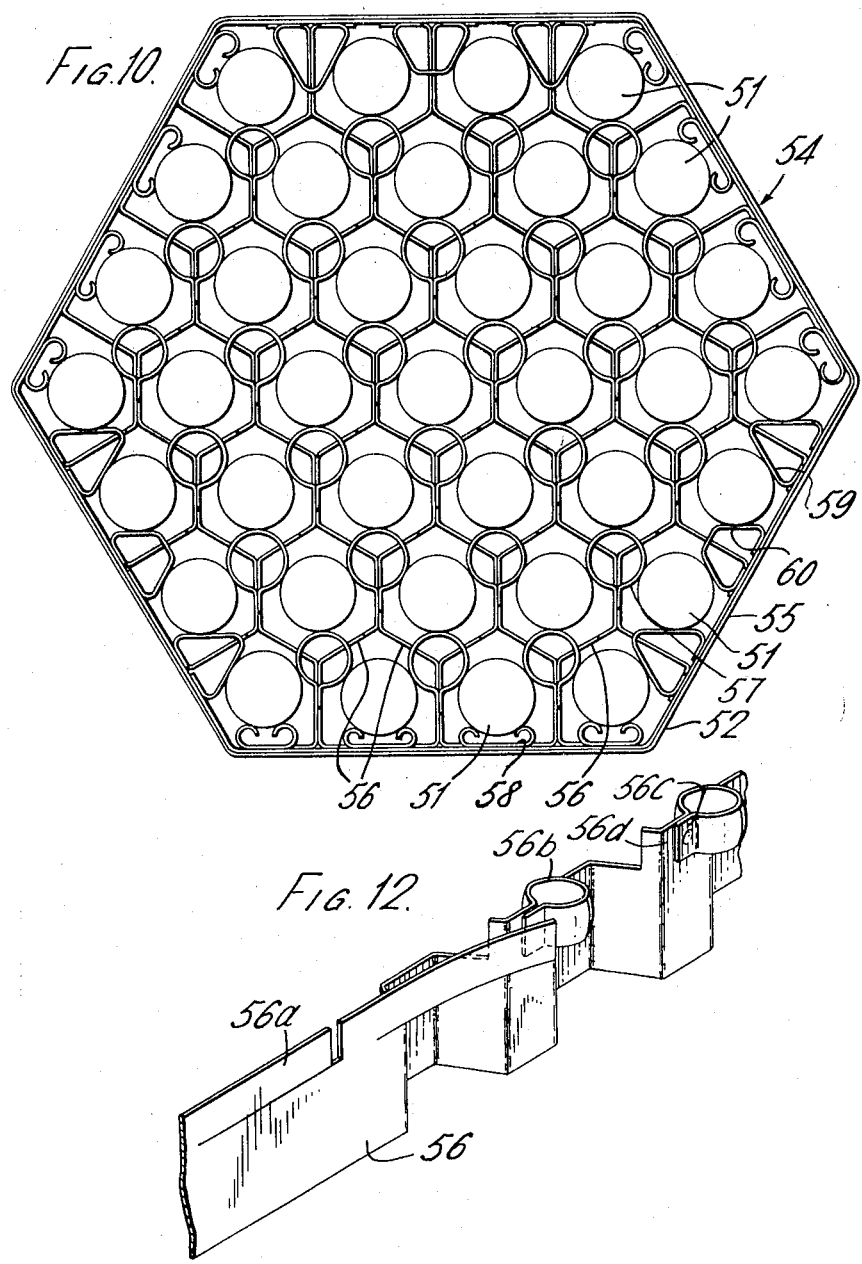

Jan. 31, 1967   A. E. TIMBS ETAL   3,301,764
NUCLEAR FUEL, GRID AND SPACER ASSEMBLY
Filed Feb. 14, 1964   7 Sheets-Sheet 7
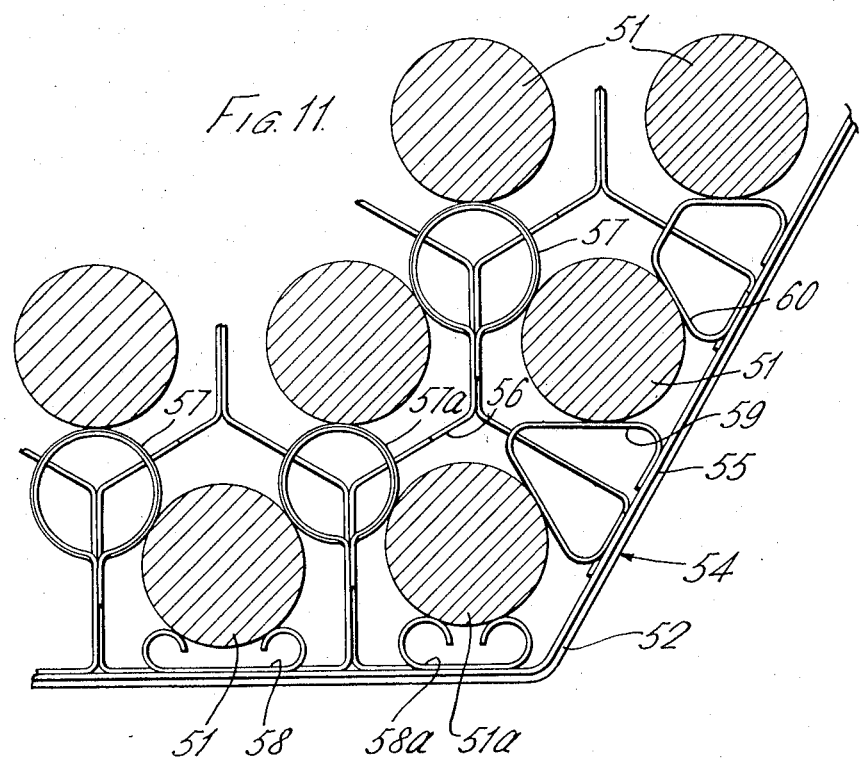
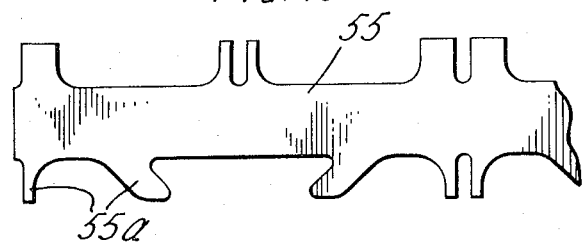

United States Patent Office 3,301,764
Patented Jan. 31, 1967

3,301,764
NUCLEAR FUEL, GRID AND SPACER ASSEMBLY
Arthur Edwards Timbs, Flixton, and John Alan Dodd, Culcheth, Warrington, England, assignors to Societe Anglo-Belge Vulcain, S.A., Brussels, Belgium
Filed Feb. 14, 1964, Ser. No. 345,028
Claims priority, application Great Britain, Feb. 22, 1963, 7,358/63; Apr. 5, 1963, 13,749/63; Oct. 9, 1963, 39,724/63
11 Claims. (Cl. 176—78)

This invention relates to nuclear fuel assemblies such as comprise a plurality of elongate fuel elements supported in a bundle with their longitudinal axes parallel. It is conventional to cool these assemblies by means of a stream of coolant medium, such as water, which flows between the fuel elements in a direction parallel to their longitudinal axes. Means are incorporated in the fuel assemblies to space the fuel elements. In previous fuel assemblies these means have comprised cellular grids penetrated by the fuel elements, the grids being formed with projections to engage and locate the fuel elements. It is also known to space fuel elements in a fuel assembly by means of ferrules, or rings, with their axes parallel to the longitudinal axes of the fuel elements, the ferrules being secured to the fuel elements themselves to form a rigid structure. This structure has disadvantages in operation, due to stresses caused by temperature differentials, and in manufacture, due to the possibility of weakening the fuel elements when the ferrules are secured to them.

According to the present invention a nuclear fuel assembly generally comprises a plurality of elongate fuel elements supported in a bundle with their longitudinal axes parallel, a cellular grid penetrated by the fuel elements, and resilient spacers carried by the grid which are interposed between adjacent fuel elements, each spacer being in the form of a resilient loop to contact adjacent fuel elements. In a nuclear fuel assembly embodying the invention the resistance to lateral bowing of the fuel elements is determined by the strength of the resilient loop and the spacing between adjacent fuel elements is determined by the dimensions of the resilient loops which nevertheless do not render the fuel assembly rigid. Preferably each spacer has the form of a circular loop with opposed arcs of the loop in contact with adjacent fuel elements, the spacing between adjacent fuel elements being determined by the diameter of the loop.

In one embodiment of the invention a nuclear fuel assembly comprises a plurality of elongate fuel elements supported in a bundle with their longitudinal axes parallel, a transverse cellular grid of sinuous metal strips assembled to define hexagonal cells which are penetrated by the fuel elements, and closed barrel-shaped loops bent out of the metal strips with their axes parallel to the longitudinal axes of the fuel elements, the loops being located as spacers at alternate cell corners so as each to be in contact with three adjacent fuel elements.

Figure 2:
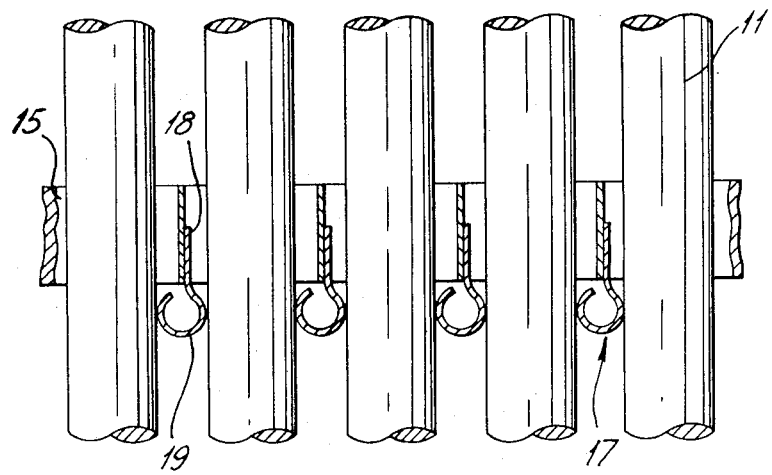
Figure 3:
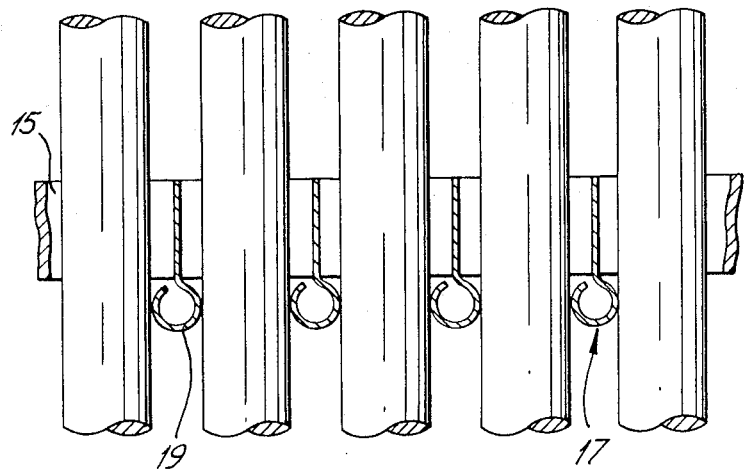
Figure 4:
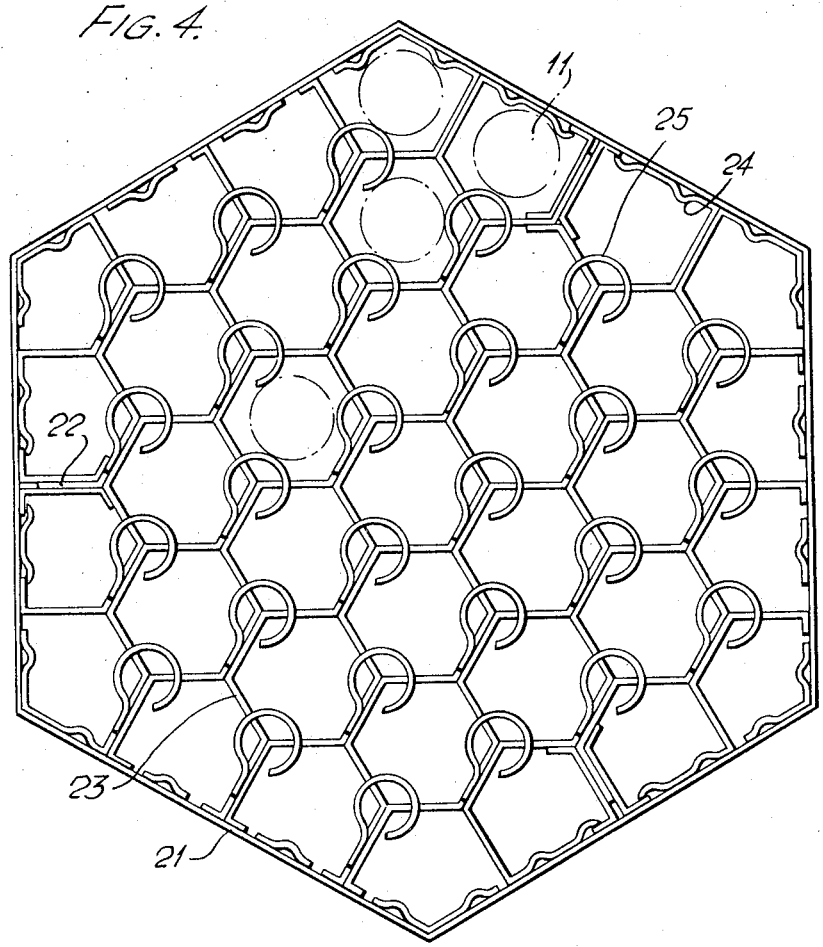
Figure 5:
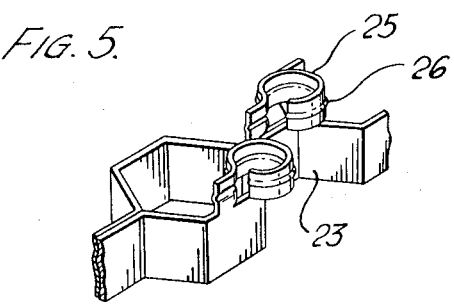
Figure 6:
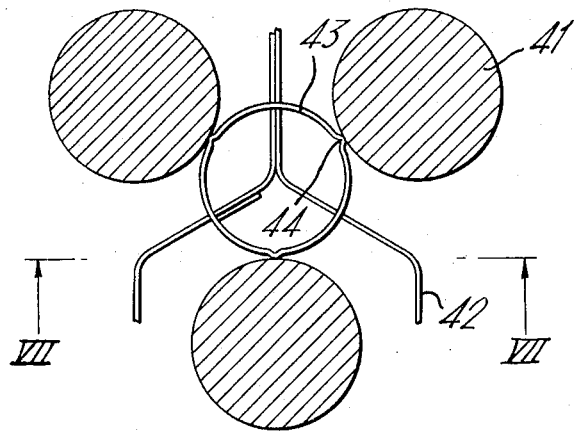
Figure 7:
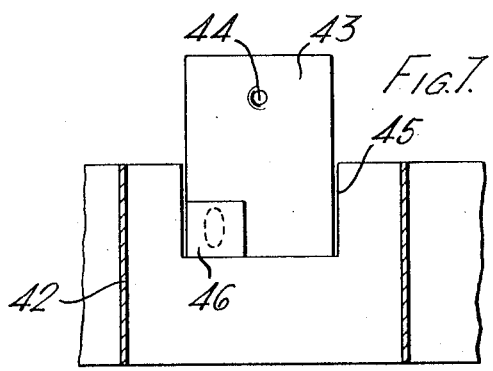
Figure 8:
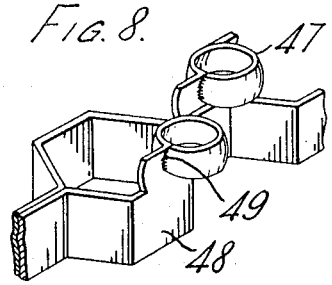

Constructions of nuclear fuel assembly and associated spacing grids embodying the invention will now be described by way of example with reference to the accompanying drawings. The invention itself is, however, as defined in the appended claims. In the drawings:

FIGURE 1 is a transverse section through the fuel assembly showing a first spacing grid, FIGURE 2 is a section on the line II—II of FIGURE 1, FIGURE 3 is a view of a second spacing grid similar to that of FIGURE 2, FIGURE 4 is a transverse section through an alternative fuel assembly showing a third spacing grid, FIGURE 5 is a perspective view of a detail of FIGURE 4, FIGURE 6 is a plan view of part of a fourth spacing grid, FIGURE 7 is a sectional view on line VII—VII of FIGURE 6, FIGURE 8 is a perspective view of part of a fifth spacing grid, FIGURE 9 is a perspective view of part of another fuel assembly, FIGURE 10 is a sectional view on the line X—X of FIGURE 9 showing a sixth spacing grid embodied in the assembly of FIGURE 9, FIGURE 11 is an expanded view of part of FIGURE 10, and FIGURES 12 and 13 are views of constituent parts of the sixth spacing grid.

*First spacing grid*

The nuclear fuel assembly of FIGURES 1 and 2 embodies a bundle of 37 elongate fuel elements 11 which are arranged with their longitudinal axes parallel and each of which is constituted by a stack of pellets of uranium dioxide encased in a stainless steel tubular sheath. These fuel elements have a length of approximately one metre and are supported at their ends by top and bottom support grids (not shown). When in position in a water moderated and cooled nuclear reactor, the fuel assembly is swept by a stream of water which flows longitudinally of the fuel elements. At intervals along the length of the fuel elements are three spacing grids 12 (of which only one is shown) which serve to space the elements from each other and to restrain but not prevent bowing of the elements intermediate their ends.

Each spacing grid 12 has an outer hexagonal frame 13 of stainless steel, the three grids being spaced from each other longitudinally of the assembly and from the end fittings by stringers 14 of angle section which extend the length of the fuel assembly and are welded to the grid frames. A cellular web within the frame is constituted by sinuous stainless steel strips 15 which are bent in a zig-zag manner so that when welded together they define hexagonal cells. The edges of this cellular web are welded to the frame 13 and the stringers 14, free ends of the strips 15 being formed into resilient blade springs 16. Four of the sides of each of the inner cells carry identical resilient spacers 17 which are common to two adjacent cells; the outer cells are generally provided with fewer spacers 17 but these are augmented by the blade springs 16. The fuel elements of the fuel assembly penetrate the cellular web, one element being located in each cell by contact with the spacers 17 and blade springs 16.

Each spacer 17 (FIGURE 2) comprises a resilient strip of stainless steel which is formed with a circular loop to provide two opposed contact portions which respectively contact two adjacent fuel elements 11. Thus each spacer 17 has a stem 18 and an open loop 19, the opposed contact portions of the spacer being diametrically opposed arcs of the loop. The spacers are carried by the grid by means of spot welds securing the spacer stems to the metal strips 15. The spacers hang down between two adjacent fuel elements and, to this extent, are common to two adjacent cells.

*Second spacing grid*

FIGURE 3 shows a second spacing grid similar to that of FIGURES 1 and 2 except that the spacers 17 are integral with the grid strips 15. These grid strips 15 are pressed out of metal sheet with projecting spacer strips which are subsequently formed into open loops 19. In this modification, therefore, the spacer stem is provided by the grid strip.

*Third spacing grid*

An alternative fuel assembly is provided with a third form of spacing grid as shown in FIGURES 4 and 5. Each grid has a hexagonal frame 21 of stainless steel supported by longitudinal stringers 22 of generally Y-section, these stringers being constituted by two channel section members secured back-to-back. A cellular web, similar to that of FIGURE 1, is constituted by zig-zag strips 23 and similar blade springs 24 are provided at the frame.

The spacers carried by this grid, however, comprise resilient circular loops 25 whose axis of rotation is parallel to the longitudinal axes of the fuel elements; these loops have, therefore, an axis of rotation which is perpendicular to the axis of rotation of the loops of FIGURES 1, 2 and 3. The loops 25 are disposed to be common to three adjacent hexagonal cells and serve to locate fuel elements within the cells by contact with the elements. Each loop 25 is integral with a grid strip 23 as shown in FIGURE 5. Before the loop is formed the blank strip is grooved so that the finished ferrule has a projecting band 26 around its periphery. Three opposed contact portions, to contact the adjacent fuel elements, are provided by three opposed arcs of the band 26, the band itself serving to reduce the area of contact between the loop and adjacent fuel elements.

In these embodiments of the invention the spacing between adjacent fuel elements is determined by the diameter of the resilient spacer loops 19 and 25. Lateral bowing of the fuel elements intermediate their ends is resisted but not prevented by the resilience of the loops 19 and loops 25. In the first, second and third spacing grids described above the loops 19 and 25 are not closed so that a certain degree of resistance to fuel element bowing is provided initially by the resilience of the loops; when lateral bowing of the fuel elements has occurred to an extent sufficient to close the loops, the resistance offered by these members to further lateral bowing of the fuel elements is markedly increased.

Fourth spacing grid

FIGURE 6 shows a fourth spacing grid which can be substituted for the third spacing grid in the fuel assembly shown in FIGURE 4. This fourth spacing grid comprises a cellular web of zig-zag strips 42 defining hexagonal cells penetrated by fuel elements 41. The spacers carried by this grid comprise resilient circular loops 43 (one loop being shown in FIGURES 6 and 7) having their axes parallel to the axes of the fuel elements. The loops 43 are disposed to be common to three adjacent hexagonal cells and serve to locate fuel elements within the cells by contact with the elements. Three opposed contact portions on each loop are provided by three pips 44 projecting from the loop. Each loop is closed and may be formed, for example, by cutting a long tube into short sections. Slots 45 in the strips 42 receive the loops, each of which is secured to the strips by a tag 46 which is bent out of the loop periphery and spot welded to a strip.

Fifth spacing grid

A fifth spacing grid shown in FIGURE 8 illustrates the formation of closed loop spacers integrally with a spacing grid. In this fifth grid the loop spacers 47, which are formed integral with the strips 48 constituting the grid, are closed by welding their free ends at a seam 49 to the spacer stems. It is to be noted that the spacers 47 are barrel-shaped to make point contact with adjacent fuel elements.

It is an advantage of these closed loop spacers that they offer uniform resistance to radial pressure from any angle.

Sixth spacing grid

A sixth spacing grid, similar to the grid of FIGURE 8, is incorporated in the fuel assembly shown in FIGURE 9. In this fuel assembly thirty-seven elongate fuel elements 51 are supported in a bundle with their longitudinal axes parallel. These fuel elements are arranged on a triangular pitch to form a bundle of hexagonal section.

The fuel element bundle is housed in a hexagonal sheath 52 through which reactor coolant is to be passed axially of the elements. Triangular apertures 53 permit cross-flow of coolant between adjacent assemblies.

The spacing of the bundle of fuel elements intermediate their ends is maintained by a cellular grid 54 which is penetrated by the elements. This grid (FIGURE 10) has an outer band 55 of hexagonal section which is welded to the inner face of the sheath 52 and a web of zig-zag strips 56 which are welded together to define thirty-seven hexagonal cells and which have flanges at their edges welded to the outer band 55. Each cell is penetrated by a fuel element. The grid carries resilient loop spacers 57 which are positioned so as to be common to three adjacent hexagonal cells and serve to locate fuel elements within the cells by sliding contact with the elements. Resilient edge spacers 58, 59 and 60 of B-section, triangular section and trapezoidal section respectively are welded to the inner face of the outer band so as to contact the outer hexagonal ring of fuel elements. The loop spacers 57 and edge spacers 58, 59 and 60 are coplanar, being located above the plane of the cellular web.

One corner of the grid of FIGURE 10 is shown in more detail in FIGURE 11. In order to avoid local overheating due to an increase in the water to fuel volume ratio at the corners of the assemblies, the corner element 51a is set slightly inwards of the hexagonal bundle. This is achieved by forming the corner loop spacer 57a to a smaller diameter than the remaining loop spacers 57; similarly the corner edge spacer 58a is deeper than the remaining B-section spacers 58.

The cellular grid 54 can be readily assembled from simple components. The outer band 55 is stamped from a strip of stainless steel (FIGURE 13); it is formed with tongues 55a which match the struts of the apertured sheath 12 (FIGURE 1). This outer band 55 is bent and welded into a hexagonal ring. The zig-zag strips 56, also of stainless steel, are formed integral with the loop spacer 57 as shown in FIGURE 12 which illustrates four stages in their production. Initially the strip 56 is slotted to provide a tongue 56a from which the spacer is to be formed. The strip 56 is then formed into its ultimate zig-zag shape whilst the tongue 56a remains straight. The tongue 56a is formed into an open loop 56b and barrelled, this barrel-shape serving to reduce the area of contact between the finished loop spacer and a fuel element. Finally the loop 56b is closed by spot-welding a flange 56c on the loop to the stem 56d to which the spacer is joined. The finished strips 56 with spacers 57 are welded together to form the cellular web and are secured into the outer band 55 by welding flanges at the ends of the strips to the inner face of the band. All the loops 57 are arranged to lie on one side of the cellular web. The edge spacers 58, 59 and 60, also of stainless steel, are welded into the inner face of the outer band so as to be coplanar with the spacer loops 57. The assembled grid is welded into the fuel assembly sheath 52 and is then ready to receive and locate fuel elements which are slidable between adjacent spacers.

What we claim is:

1. A nuclear fuel assembly comprising a plurality of elongate fuel elements supported in a bundle with their longitudinal axes parallel, sinuous metal strips assembled into a transverse cellular grid having hexagonal cells penetrated by the fuel elements, the strips having stems and curved tongues joined to the stems to form closed loops with their axes parallel to the longitudinal axes of the fuel elements, the loops being located as resilient spacers at alternate cell corners each in contact with three adjacent fuel elements.

2. A nuclear fuel assembly as claimed in claim 1 wherein the circumferences of the loops include projections in contact with the fuel elements.

3. The nuclear fuel assembly comprising a plurality of elongate fuel elements supported in a bundle with their longitudinal axes parallel, a cellular grid penetrated by the fuel elements, and resilient spacers fixedly carried by and integral with the grid which are interposed between adjacent fuel elements, each spacer being in the form of a resilient loop in contact with adjacent fuel elements, the walls of each loop being outwardly bowed when viewed in axial section such that the convex outer surface of each loop contacts adjacent fuel elements.

4. A nuclear fuel assembly comprising a plurality of elongate fuel elements supported in a bundle with their longitudinal axes parallel, a rigid basic grid of cellular form having polygonal cells each penetrated by one fuel element, the grid comprising sinuous metal strips assembled to define the cells, and resilient spacers carried by the basic grid which are interposed between adjacent fuel elements, each spacer being in the form of a resilient loop formed from at least one portion of a single metal strip and in contact with adjacent fuel elements.

5. A nuclear fuel assembly as set forth in claim 4 wherein each resilient loop is located at a corner of at least one polygonal cell.

6. A nuclear fuel assembly as set forth in claim 4 wherein each resilient loop is located at a common corner of at least two polygonal cells and extends into said two cells to bear against the fuel elements located therein.

7. A nuclear fuel assembly as claimed in claim 4 wherein the loops have their axes parallel to the longitudinal axes of the fuel elements.

8. A nuclear fuel assembly as claimed in claim 7 wherein the circumferences of the loops include projections in contact with the fuel elements.

9. A nuclear fuel assembly as claimed in claim 7 wherein the walls of each loop are outwardly bowed when viewed in axial section such that the convex outer surface of each loop contacts adjacent fuel elements.

10. A nuclear fuel assembly comprising a plurality of elongate fuel elements supported in a bundle with their longitudinal axes parallel, a cellular grid comprising sinuous metal strips defining polygonal cells penetrated by the fuel elements, the strips having slots formed therein, and resilient rings secured immovably in the slots and interposed as spacers between and in contact with adjacent fuel elements.

11. A nuclear fuel assembly comprising a plurality of elongate fuel elements supported in a bundle with their longitudinal axes parallel, a transverse rigid basic grid of cellular form comprising a plurality of sinous metal strips, defining polygonal cells each penetrated by a fuel element, and resilient spacers connected to the grid and located between adjacent fuel elements each resilient spacer comprising a stem terminating in a loop at one end of the stem, the longitudinal axis of the loop being transverse to the longitudinal axis of the stem, the stem being connected at one end to one of said sinuous metal strips and extending therefrom substantially parallel to the longitudinal axes of said fuel elements between two adjacent fuel elements to dispose said loop between two adjacent fuel elements with its longitudinal axis transverse to the longitudinal axes of the fuel element and with opposed arcs of its convex outer surface bearing against the two adjacent fuel elements.

References Cited by the Examiner

UNITED STATES PATENTS

| 3,070,534 | 12/1962 | Kooistra | 176—78 |
| 3,182,003 | 5/1965 | Thorp et al. | 176—78 |
| 3,228,854 | 1/1966 | Bekkering et al. | 176—78 |

FOREIGN PATENTS

| 1,086,356 | 8/1960 | Germany. |
| 822,790 | 10/1959 | Great Britain. |
| 892,241 | 3/1962 | Great Britain. |

OTHER REFERENCES

German printed application, 1,104,082, April 1961, Kropfl et al.

CARL D. QUARFORTH, *Primary Examiner.*

REUBEN EPSTEIN, LEON D. ROSDOL, *Examiners.*

H. E. BEHREND, *Assistant Examiner.*